US010336025B2

(12) United States Patent
Brunt, Jr. et al.

(10) Patent No.: US 10,336,025 B2
(45) Date of Patent: Jul. 2, 2019

(54) COMPOUND LENS FOR USE WITH ILLUMINATION SOURCES IN OPTICAL SYSTEMS

(71) Applicants: LumenFlow Corp., Wyoming, MI (US); Dow Corning Corporation, Midland, MI (US)

(72) Inventors: Harold W. Brunt, Jr., Grand Rapids, MI (US); Michael R. Strong, Midland, MI (US); Gilbert M. Pinter, Muskegon, MI (US)

(73) Assignees: Lumenflow Corp., Wyoming, MI (US); Dow Silicones Corporation, Midland, MI (US)

( * ) Notice: Subject to any disclaimer, the term of this patent is extended or adjusted under 35 U.S.C. 154(b) by 431 days.

(21) Appl. No.: 15/097,324

(22) Filed: Apr. 13, 2016

(65) Prior Publication Data
US 2016/0305629 A1   Oct. 20, 2016

Related U.S. Application Data

(60) Provisional application No. 62/147,186, filed on Apr. 14, 2015.

(51) Int. Cl.
*F21K 9/00* (2016.01)
*B29D 11/00* (2006.01)
(Continued)

(52) U.S. Cl.
CPC .... *B29D 11/00865* (2013.01); *B29C 45/0001* (2013.01); *B29C 45/0013* (2013.01);
(Continued)

(58) Field of Classification Search
CPC ........ B29D 11/00865; B29D 11/00403; B29C 45/16; B29C 45/0001; B29C 45/0013;
(Continued)

(56) References Cited

U.S. PATENT DOCUMENTS

2008/0170305 A1* 7/2008 Tsai ................. B29D 11/00009
  359/819
2011/0266576 A1* 11/2011 Engl ...................... H01L 33/58
  257/98

(Continued)

OTHER PUBLICATIONS

"A Comparison of Materials for Injection Molding Optical Parts", Dow Corning Corporation, available at https://www.dowcorning.com/content/publishedlit/11-1749.pdf (2013).
"One-Piece Compound Lens", Dow Corning Corporation, available at https://www.dowcorning.com/content/publishedlit/11-3371-01_Insert_Q.pdf (May 2015).

(Continued)

*Primary Examiner* — Y M. Lee
(74) *Attorney, Agent, or Firm* — Warner Norcross + Judd LLP

(57) ABSTRACT

A compound lens and a related method of manufacture are provided. The compound lens includes a first lens element and a second lens element such that a light emitting surface of the first lens element is integrally joined to a light receiving surface of the second lens element, the first and second lens element being in optical alignment with each other. The first and second lens element are molded from optical grade silicone and can achieve complex illumination objectives not possible with single lens constructions. The method of manufacture includes injecting a silicone resin molding compound into a mold cavity having the desired shape of the compound lens. The method of manufacture can include over-molding a lens holding member onto the compound lens and adding electro-optically active particles to a surface of the compound lens or to the silicone resin forming the compound lens.

13 Claims, 8 Drawing Sheets

(51) Int. Cl.
*B29C 45/00* (2006.01)
*B29C 45/26* (2006.01)
*B29C 45/14* (2006.01)
*B29C 45/16* (2006.01)
*B29K 83/00* (2006.01)
*B29K 105/00* (2006.01)
*B29K 105/16* (2006.01)

(52) U.S. Cl.
CPC .... *B29C 45/0053* (2013.01); *B29C 45/14778* (2013.01); *B29C 45/16* (2013.01); *B29C 45/26* (2013.01); *B29D 11/00403* (2013.01); *B29C 2045/0079* (2013.01); *B29C 2045/2683* (2013.01); *B29K 2083/00* (2013.01); *B29K 2105/16* (2013.01); *B29K 2105/251* (2013.01); *B29K 2105/253* (2013.01)

(58) Field of Classification Search
CPC ............... B29C 45/0053; B29C 45/26; B29C 45/14778; B29C 2045/0079; B29C 2045/2683; B29K 2105/251; B29K 2083/00; B29K 2105/253; B29K 2105/16; F21V 5/008; F21V 5/04; F21V 5/00
See application file for complete search history.

(56) References Cited

U.S. PATENT DOCUMENTS

| | | | |
|---|---|---|---|
| 2012/0065343 A1 | 3/2012 | Bahadur et al. | |
| 2012/0300469 A1* | 11/2012 | Jorgensen | F21V 5/008 362/327 |
| 2015/0062920 A1* | 3/2015 | Wu | F21V 5/008 362/311.02 |
| 2015/0078005 A1* | 3/2015 | Renn | F21V 23/005 362/294 |
| 2015/0223672 A1* | 8/2015 | Otten | A61B 1/253 600/169 |
| 2015/0236227 A1* | 8/2015 | Yan | H01L 33/58 257/88 |

OTHER PUBLICATIONS

"Dow Corning Silicones Create Higher Performance, Lower TCO for LumenFlow", Dow Corning Corporation, available at https://www.dowcorning.com/content/publishedlit/11-3584-lumenflow-case-study.pdf (Oct. 2015).

"Discover the Unprecedented Design Freedom Offered by Silicone Optics", Dow Corning Corporation, available at https://www.dowcorning.com/content/publishedlit/11-3639-design-freedom-silicone-optics.pdf (Feb. 25, 2016).

* cited by examiner

COMPOUND LENS FOR USE WITH ILLUMINATION SOURCES IN OPTICAL SYSTEMS

CROSS-REFERENCE TO RELATED APPLICATIONS

This application claims the benefit of U.S. Application No. 62/147,186, filed Apr. 14, 2015, the disclosure of which is incorporated by reference in its entirety.

FIELD OF THE INVENTION

The present invention relates to compound lenses for use with light emitting diodes (LEDs) and other illumination sources.

BACKGROUND OF THE INVENTION

LEDs are semiconductor devices that emit light when a voltage is applied. LEDs continue to experience an increase in market share over conventional forms of lighting and benefit from a superior lighting quality and a high energy efficiency. In many instances, LEDs are less expensive to manufacture than conventional forms of lighting, including fluorescent and incandescent lighting for example.

Existing LED systems often employ a compound lens to achieve shaping and control of emitted LED light in ways not available from single-element lenses. For example, it is known to use two or more individual lenses, physically mounted in the illumination path of the LED, to achieve the desired focus, columniation, beam spread, and shape of emitted LED light.

The resulting combination of LED light (visible and invisible to the human eye) using conventional compound lenses are necessarily mechanically and optically complex. Existing compound lens systems require costly mechanical assemblies to capture and align their multiple, individual focusing lenses. Existing compound lens systems are often inflexible (e.g., not tunable) with regard to meeting their primary design configurations. In addition, existing compound lens systems generally do not offer a method to easily modify the properties of the emitted radiation without costly ancillary mountings and focusing housings.

SUMMARY OF THE INVENTION

In one aspect of the invention, a compound lens is provided. The compound lens includes a plurality of lens elements that are co-molded from optical grade silicone. The lens elements can include a first lens element co-molded with a second lens element such that a light emitting surface of the first lens element is integrally joined to a light receiving surface of the second lens element. The first and second lens elements are in optical alignment along a common optical axis with each other and an LED light source. The LED light source is in sequential optical communication with the first and second lens elements.

In one embodiment, the compound lens includes four mechanically interconnected, optically coupled lens elements. The four lens elements include a plano-concave lens, a hemispherical lens, a bi-concave frusto-conical lens, and a bi-convex aspheric lens. The plan-concave lens and the hemispherical lens reduce the optical path difference between the center ray bundles and the sagittal ray bundles, and the frusto-conical lens separates the center ray bundles from the sagittal ray bundles. The lens elements are optically coupled to each other to reduce the wavefront error of light propagating through the compound lens. The compound lens can achieve mechanical rigidity through the interfaces between the lens elements without using a mechanical assembly. If desired, the compound lens can also be inset within a thermoplastic lens holding member to provide added stability.

In another embodiment, the compound lens is configured to include physical separation between at least two lens elements such that a lens element does not physically interface with an immediately adjacent lens element. Instead, the compound lens defines a transition space to collect or collimate the inter-lens illumination path. In this embodiment, the compound lens includes a lens holding member defining a lens cavity, within which the at least two lens elements are disposed, while the outer perimeter of the at least two lens elements are joined together by the lens holding member.

In another aspect of the invention, a method for manufacturing a compound lens is provided. The method includes providing a silicone resin molding compound, providing a mold having a mold cavity in the shape of a compound lens, injecting the silicone resin molding compound into the mold cavity, curing the molding compound within the mold cavity to form a compound lens, and removing the compound lens from the mold cavity, wherein the compound lens includes a first lens element integrally joined to a second lens element.

In one embodiment, the compound lens is molded with optical grade silicone into which an optically active material may be introduced while the resin is still in its pre-cured state. For example, the silicone resin can be doped with optically active nanoparticles that provide the ability to tune the compound lens to selectively refract light and change the refractive index of the compound lens. Alternatively, the compound lens can include an electro-optical coating for controlling the optical density or optical filtering properties of the compound lens.

In another embodiment, the method for manufacturing the compound lens can further include over-molding the compound lens with a lens holding member. The lens holding member can include an opaque thermoset material having a melt-flow temperature below the reflow temperature of the compound lens. The lens holding member can provide dimensional stability and structural rigidity to the compound lens.

The compound lens can be manufactured to provide highly controlled angled divergent beams with substantially uniform intensity profiles. The compound lens can be used to create an inexpensive, durable lens system for machine vision or general illumination applications using high power LED illumination sources. Other potential advantages of the compound lens include: the ability to integrate the optical function of multiple lens elements into a single molded package; the ability to select an angle range from less than ten degrees to sixty degrees; a less expensive manufacturing process with reductions in assembly time and cost; and the ability to withstand high temperatures and harsh environments.

These and other advantages and features of the invention will be more fully understood and appreciated by reference to the drawings and the description of the current embodiments.

DESCRIPTION OF THE CURRENT EMBODIMENTS

The invention as contemplated and disclosed herein includes a compound lens and a related method of manufacture. As set forth in Part I below, the compound lens can include integrally joined lens elements that are formed from an optical grade silicone for an optical emitter. As set forth in Part II below, the related method of manufacture can include injecting a silicone resin molding compound into a mold cavity having the desired shape of the compound lens and optionally over-molding a lens holding member onto the compound lens. As set forth in Part III below, a molding composition is described in connection with the compound lens of Part I and the method of manufacture in Part II.

I. Compound Lens

Figure 1:
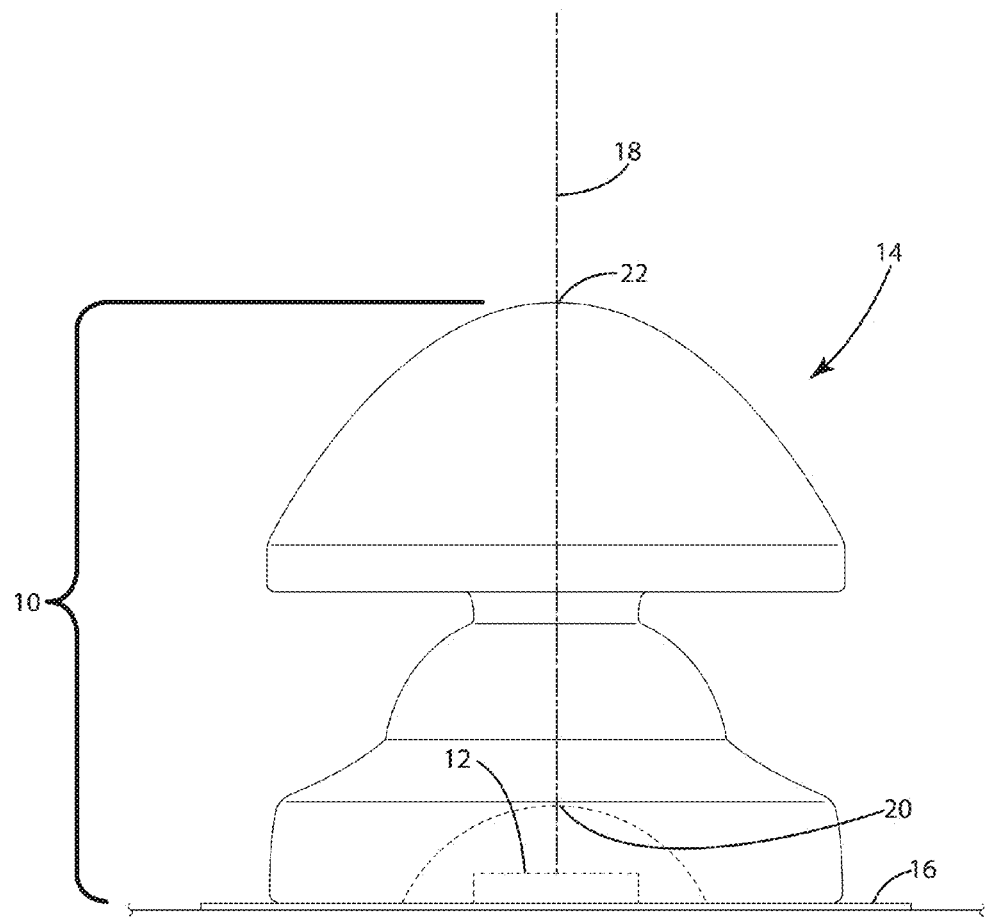
FIG. 1 is a side elevation view of a compound lens forming part of an optical emitter in accordance with a current embodiment.

A compound lens in accordance with one embodiment is depicted in FIG. 1 and generally designated 10. The compound lens 10 is illustrated in combination with an LED 12 to form an optical emitter 14. The LED 12 is directly or indirectly mounted to a substrate 16, for example a printed circuit board (PCB). The LED 12 emits light upon an electrical current being passed through the LED 12. The light emitted by the LED 12 passes through the compound lens 10 along a common optical axis 18, which extends from a proximal end 20 (nearest to the LED 12) to a distal end 22 (furthest from the LED 12). Though one LED 12 is shown, a plurality of LEDs can be used in other embodiments where desired.

The compound lens 10 is oriented to receive light from the LED 12 and includes a plurality of integral lens elements that are coaxially aligned with each other. As the term is used herein, a "lens element" includes any optical element for concentrating and/or dispersing light rays. The lens elements include at least one light receiving surface (or incident surface), at least one light emitting surface (or exit surface), and an interior portion therebetween. The light receiving and emitting surfaces can include those portions integrally joined to an immediately-adjacent lens element (constituting an interior portion of the compound lens 10). In the embodiment illustrated in FIG. 1, at least four lens elements are shown, but greater or fewer number of lens elements can be included in other embodiments, provided there are at least two lens elements. In the embodiment illustrated in FIG. 1, each lens element is integrally joined to an immediately adjacent lens element in a lens stack. In the embodiment illustrated in FIG. 8, however, at least two immediately adjacent lens elements of the compound lens 10 are spaced apart to define a transition space therebetween. As discussed in Part II below, the lens elements can be co-molded from an optical grade silicone resin and can be co-molded from an optical grade engineering thermoplastic (ETP) to provide the desired thermal resistance, chemical resistance, and mechanical properties.

Figure 2:
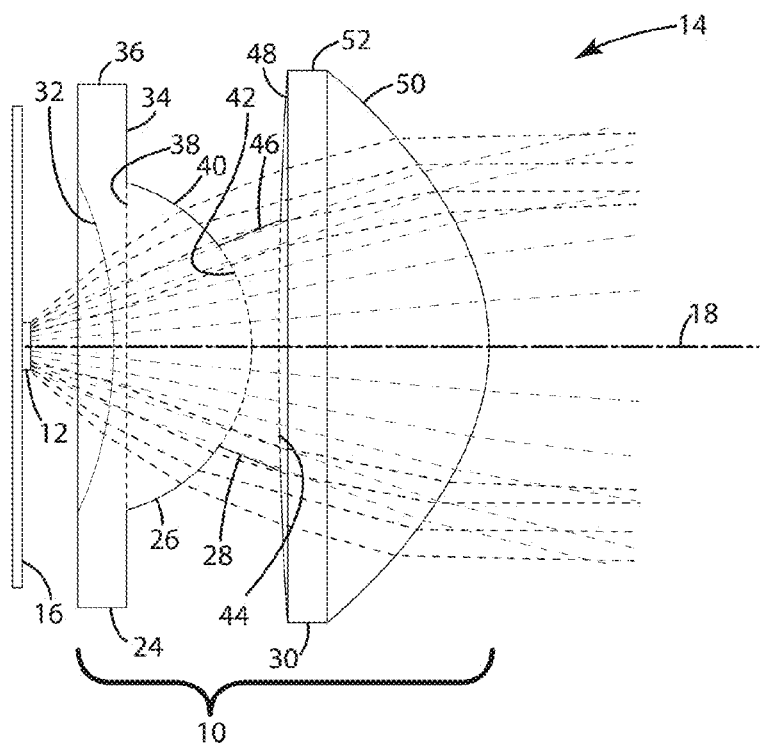
FIG. 2 is a sectional view of a compound lens forming part of an optical emitter in accordance with a current embodiment including ray traces from zero to forty-five degrees.
Figure 3:
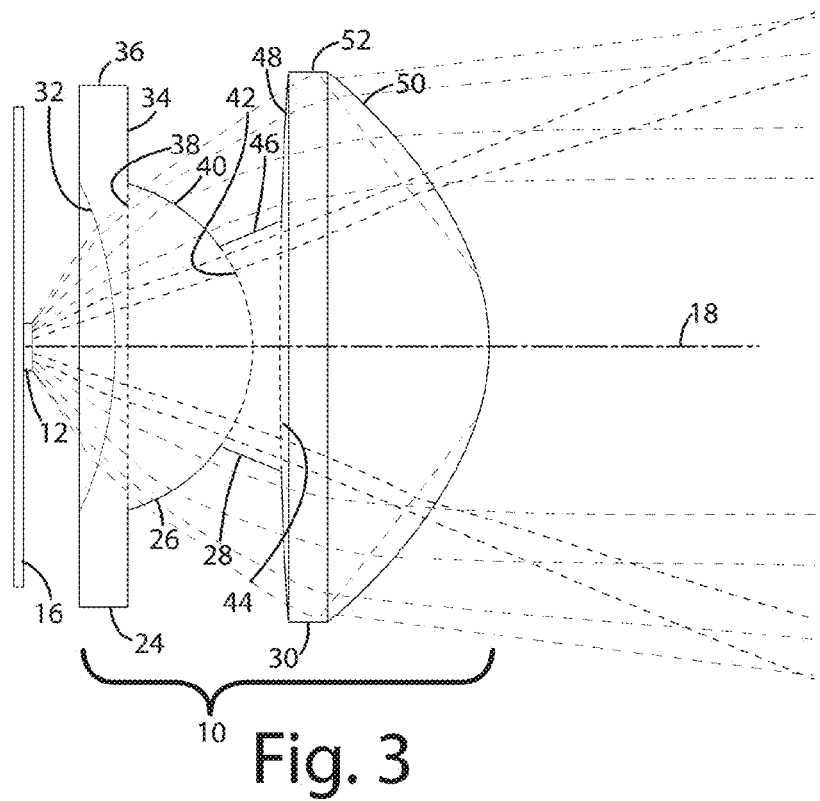
FIG. 3 is a sectional view of a compound lens forming part of an optical emitter in accordance with a current embodiment including ray traces from forty-five to sixty degrees.

Referring now to FIGS. 2-3, an optical emitter 14 includes a compound lens 10 and an LED 12. The compound lens 10 includes four lens elements 24, 26, 28, 30, which can be aligned along a common optical axis 18. The first lens element 24 is positioned nearest to the LED 12 and includes a plano-concave lens. The plano-concave lens includes a concave light receiving surface 32 opposite of a planer light emitting surface 34, such that at least a portion of the light receiving surface 32 is concave and at least a portion of the light emitting surface 34 is planar. The light receiving surface 32 and the light emitting surface 34 are joined by an annular intermediate surface 36 that extends around the periphery of the first lens element 24. In the illustrated embodiment, the light receiving surface 32 is spaced apart from the LED 12 and the substrate 16, while in other embodiments at least a portion of the light receiving surface 32 directly engages the LED 12 and/or the substrate 16 to encapsulate the LED 12 and/or the substrate 16.

The second lens element 26 includes a hemispherical lens in the illustrated embodiment. The hemispherical lens includes a planar light receiving surface 38 opposite of a hemispherical light emitting surface 40, such that at least a portion of the light receiving surface 38 is planar and at least a portion of the light emitting surface 40 is hemispherical. The light emitting surface 34 of the first lens element 24 is integrally joined to the light receiving surface 38 of the second lens element 26 along an interface between the first lens element and the second lens element, such that the first lens element 24 is immovably cohered to the second lens element 26.

Figure 4:
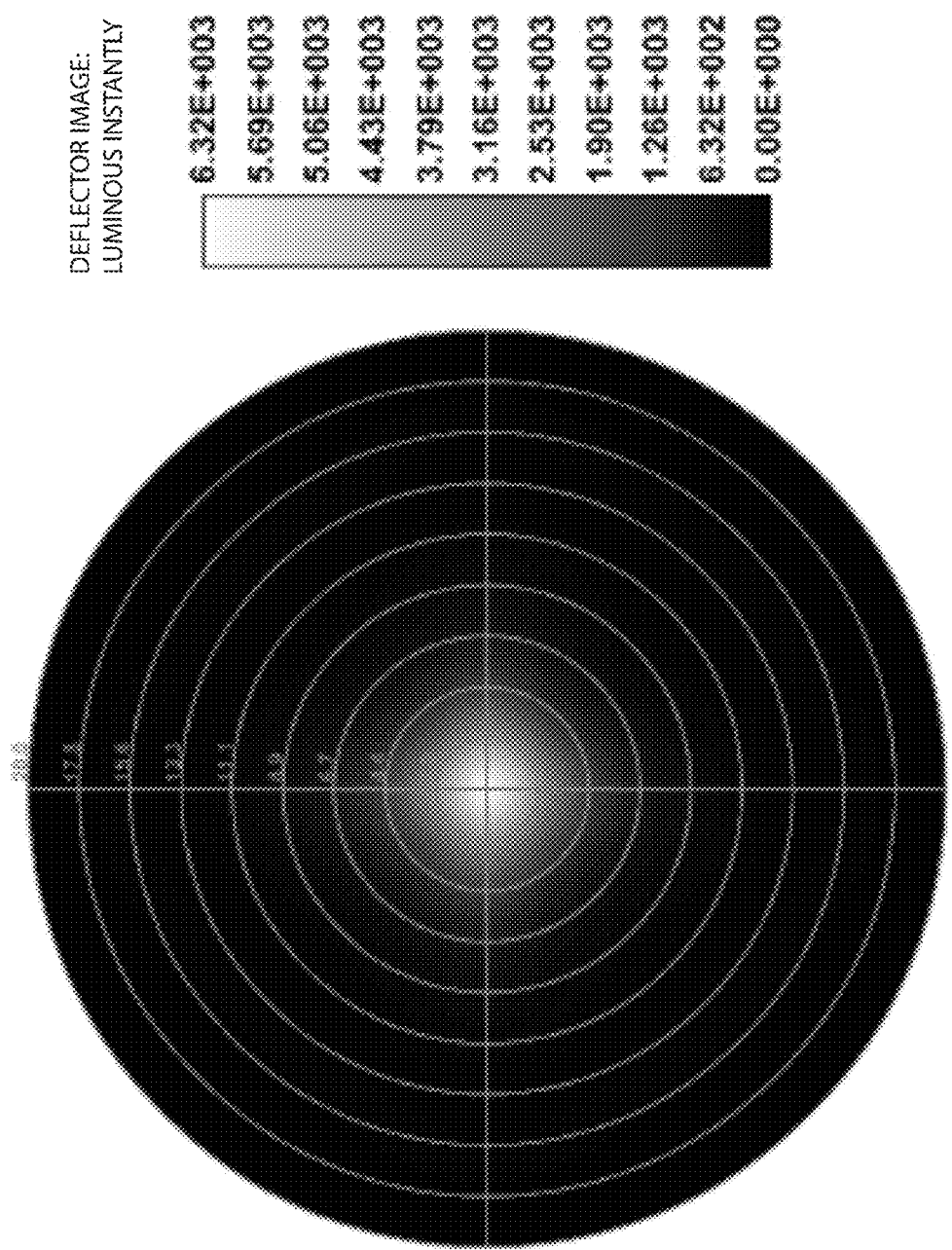
FIG. 4 is a ten degree field image intensity graph for the compound lens of FIGS. 2-3.

The third lens element 28 includes a bi-concave frusto-conical lens in the illustrated embodiment. The bi-concave frusto-conical lens includes a concave light receiving surface 42 opposite of a concave light emitting surface 44, such that at least a portion of the light receiving surface 42 is concave—matching the curvature of the hemispherical light emitting surface of the second lens element—and at least a portion of the light emitting surface 44 is concave. The frusto-conical lens element 28 breaks up light from the light emitting surface 40 into two discrete light bundles. The first ray bundle, which is the center ray bundle, propagates from surface 42 to surface 44. The index of refraction of element 28 is the same as the index of refraction of lens elements 26 and 30, thereby reducing the effective optical power on the center ray bundle. The second ray bundle, which is the sagittal ray bundle, propagates from the surface 40 to surface 48 without propogating through the third lens element 28, as the outer diameter of the third lens element 28 is less than the outer diameter of the immediately adjacent second and fourth lens elements 26, 30. Due to the refractive interface of vacuum (or air) upon the exposed portions of surfaces 40 and 48, the sagitall ray bundle experiences additional refractive optical power, which allows additional control of the wave fronts or optical path distance of the saggital ray bundle. Thus, by adjusting surfaces 40 and 48, the optical path of the sagitall rays can be brought into alignment with the optical path of the center ray bundle, thereby allowing the collective light bundle (both center and sagittal) to come into a common focus as illustrated in FIG. 4. Referring again to FIG. 2, the light receiving surface 42 and the light emitting surface 44 are joined by a frusto-conical intermediate surface 46 that extends around the periphery of the third lens element. The light emitting surface 40 of the second lens element 26 is integrally joined to the light receiving surface 42 of the third lens element 28 along an interface between the third lens element and the second lens element, such that the third lens element 28 is immovably cohered to the second lens element 26, and indirectly immovably cohered to the first lens element 24 via the second lens element 26.

The fourth lens element 30 includes a bi-convex aspheric lens in the illustrated embodiment. The bi-convex aspheric lens includes a convex light receiving surface 48 opposite of an aspheric light emitting surface 50, such that at least a portion of the light receiving surface 48 is convex and at least a portion of the light emitting surface 50 is convex aspheric. The light receiving surface 48 and the light emitting surface 50 are joined by an annular intermediate surface 52 that extends around the periphery of the fourth lens element 30. The light receiving surface 48 of the fourth lens element 30 is integrally joined to the light emitting surface 44 of the third lens element 28 along an interface between the fourth lens element 30 and the third lens element 28, such that the fourth lens element 30 is immovably cohered to the third lens element 28, and indirectly immovably cohered to the first and second lens elements 24, 26 via the third lens element 28.

The compound lens 10 of the optical emitter 14 generally includes adjacent lens elements that are immovably cohered to each other along all or a portion of the respective light emitting and light receiving surfaces. That is, all or a portion of a first lens element light emitting surface will be integrally joined to the light receiving surface of the second lens element. The compound lens 10 described above can be modified to include greater or few number of lens elements. In addition, the compound lens 10 can be modified to include lens elements that differ from the lens elements noted above. Example lens elements include, without limitation, biconvex lenses, biconcave lenses, positive meniscus lenses, and negative meniscus lenses. Other lens elements can be used in other embodiments as desired.

Figure 5:
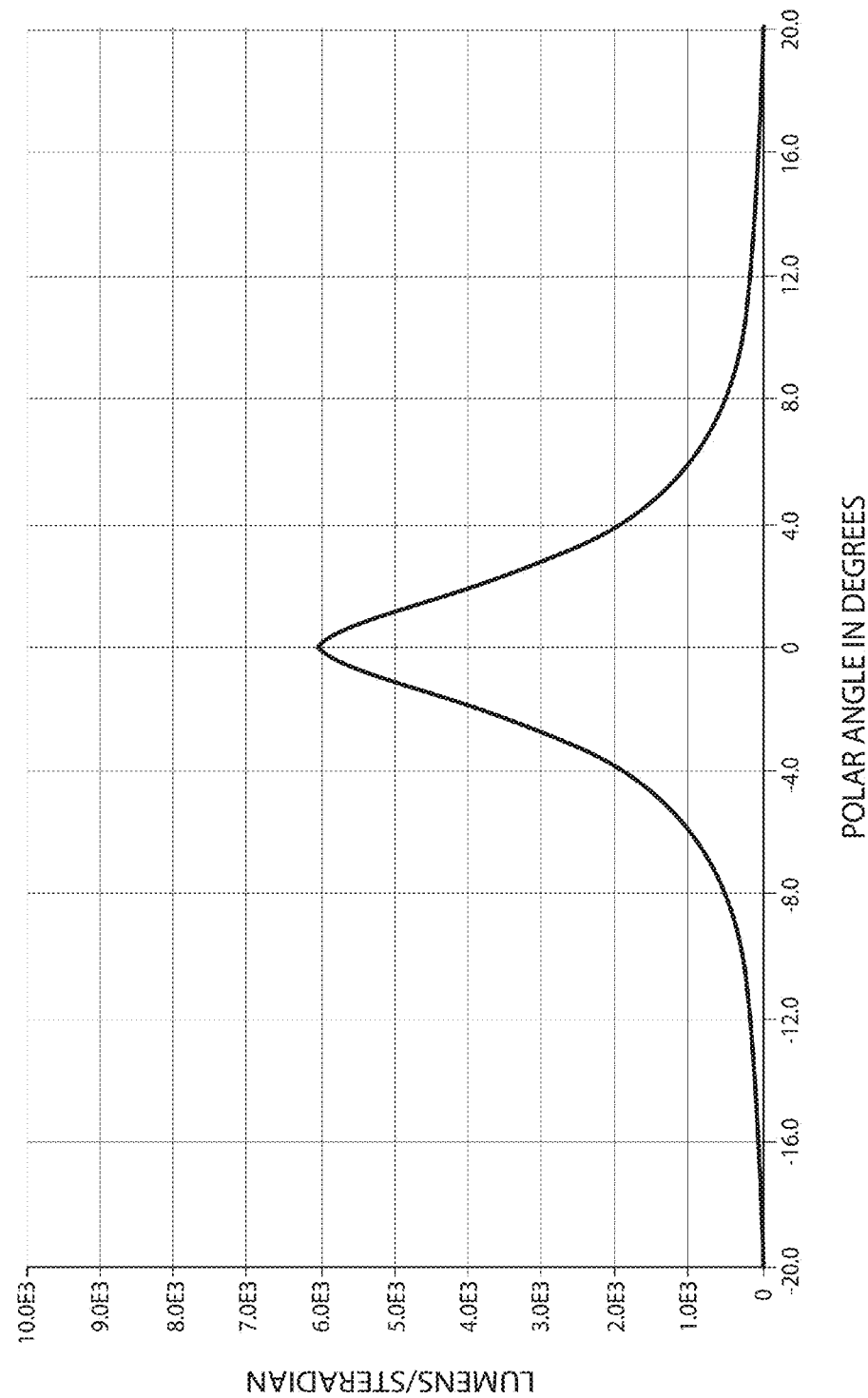
FIG. 5 is a ten degree field image intensity profile for the compound lens of FIGS. 2-3.
Figure 6:
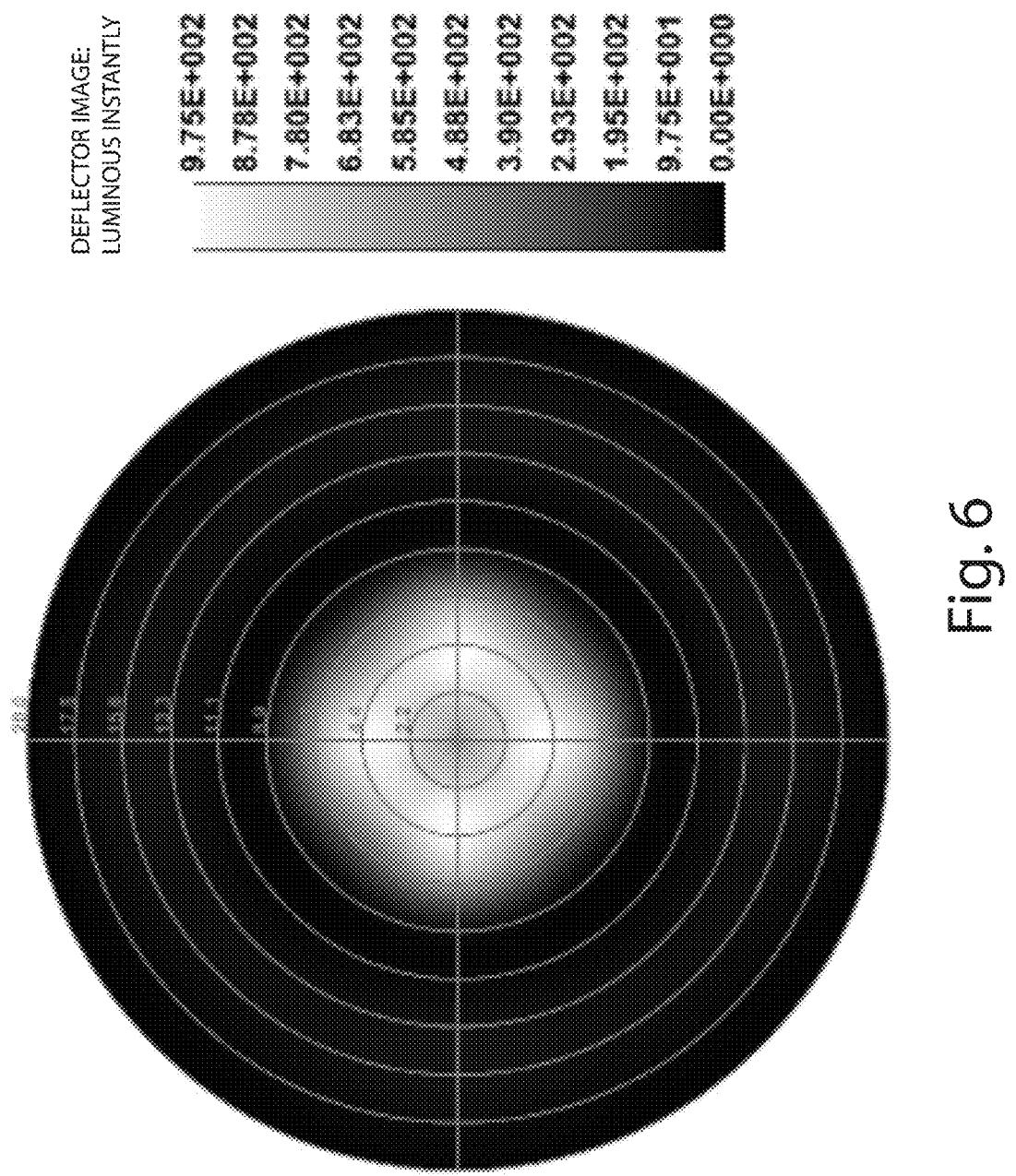
FIG. 6 is a ten degree field image intensity graph for a compound lens which lacks the frusto-conical lens element of FIGS. 2-3.
Figure 7:
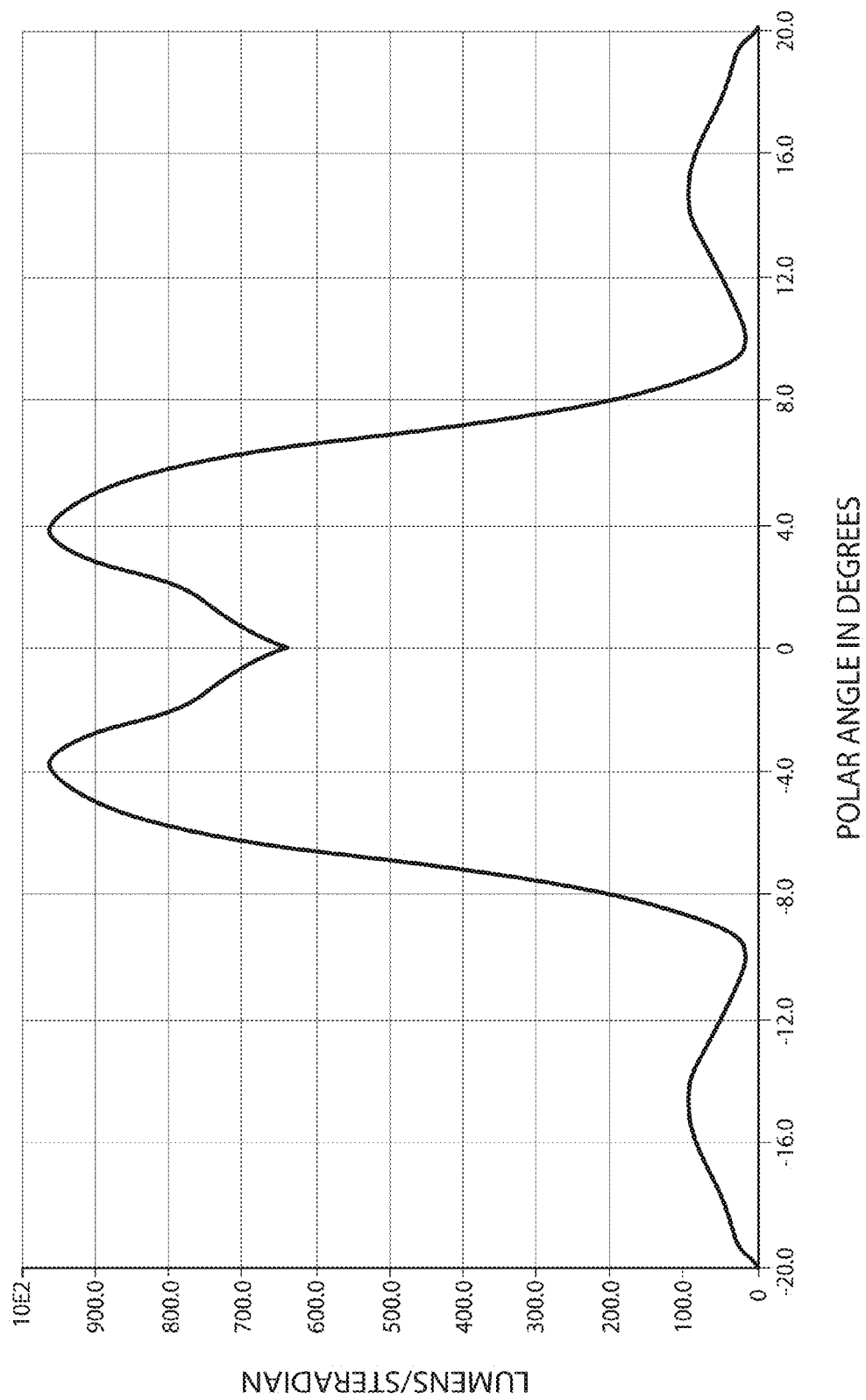
FIG. 7 is a ten degree field image intensity profile for a compound lens which lacks the frusto-conical lens element of FIGS. 2-3.

The compound lens 10 can be constructed to provide highly controlled angled divergent beams with substantially uniform intensity profiles. FIG. 2 includes ray traces for a fifteen degree field layout, and FIG. 3 includes ray traces for a sixty degree to forty-five degree layout. FIGS. 4 and 5 include a ten degree field image intensity graph and field intensity image profile for the compound lens of FIGS. 2-3. FIGS. 6 and 7 include a ten degree field image intensity graph and field intensity image profile for the compound lens of FIGS. 2-3 as modified with the omission of the bi-convex frusto-conical lens element 28.

The foregoing graphs and profiles illustrate the ability of the compound lens 10 to control the emission of light from different areas of an emission surface. For example, the compound lens 10 can reduce the optical path difference of emitted light. As used herein, the "optical path difference" (OPD) is the difference in the path length of two optical paths. In the embodiment shown in FIGS. 2-3, the compound lens 10 reduces the OPD between a first optical path and a second optical path. The first optical path can include light emitted from the geometric center of the LED 12. The second optical path can include light emitted from the geometric periphery of the LED. Further by example, the compound lens 10 can reduce the wave front error of light incident on an illuminated surface. As used herein, "wave front error" (WFE) is the difference between the longest and shortest optical paths. The lens elements 24, 26, 28, 30 can therefore be said to be optically coupled to each other to control the emission of light from the LED 12. As used herein, two or more lens elements are "optically coupled" to each other (even if not physically coupled to each other) if light from an emission surface sequentially propagates through the two or more lens elements, such that the OPD or WFE of light from the emission surface is reduced by the two or more lens elements, e.g., as compared to a system in which the two or more lens elements were not present. By reducing the OPD and/or WFE of the emitted light, the spot quality of emitted light can be improved and a more uniform far field light pattern can be provided.

Figure 8:
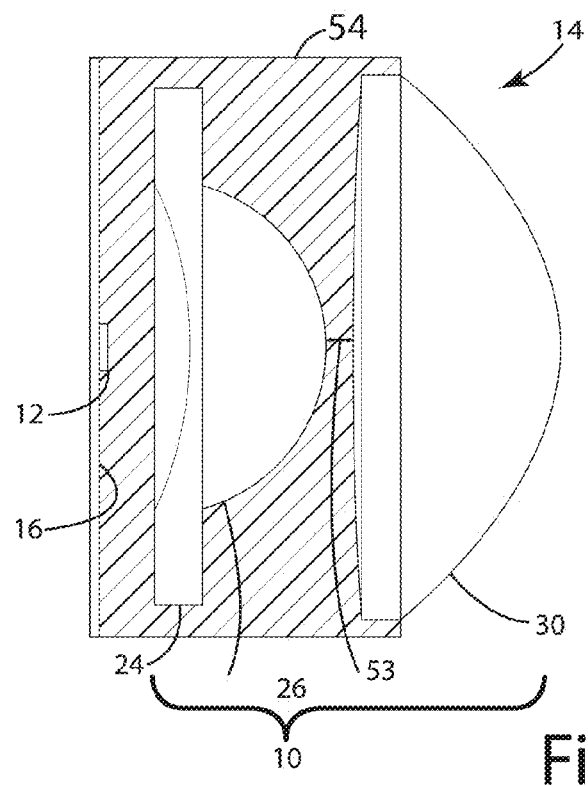
FIG. 8 is a sectional view of a compound lens including a lens holding member in accordance with a current embodiment.

As further optionally shown in FIG. 8, the compound lens 10 can include a transition space 53 separating at least two adjacent lens elements, such that the entirety of the light emitting surface of one lens element is spaced apart from the entirety of the light receiving surface of an immediately adjacent lens element. In the embodiment illustrated in FIG. 8, a bi-concave frusto-conical lens is omitted (e.g., 28 in FIG. 2), such that the transition space 53 separates the hemispherical lens 26 from the bi-convex aspheric lens 30, the transition space 53 being free of any lens elements. In particular, the entirety of the light emitting surface of the hemispherical lens 26 is spaced apart from the entirety of the light receiving surface of the bi-convex aspheric lens 30. The physical separation provides a transition space to collect or collimate the inter-lens illumination path between lens elements. While only one transition space is shown, the compound lens 10 can include multiple transition spaces.

As also shown in FIG. 8, the optical emitter 14 includes a compound lens 10, an LED 12, a substrate 16, and a lens holding member 54. As the term is used herein, a "lens holding member" includes any peripheral structure interconnecting two or more of the lens elements. The lens holding member 54 is generally inflexible in the current embodiment, being overmolded onto two or more of the lens elements from an opaque thermoset resin to provide rigidity and alignment for the lens elements comprising the lens stack. In other embodiments, the lens holding member can include an elastic exo-skeleton which can be compressed or extended to create variable focusing properties of the emitted light. The lens holding member 54 interconnects lens elements that are spaced apart from each other, for example elements 26 and 30 in FIG. 8. The lens holding member 54 can also interconnect lens elements that are already cohered to each other, for example elements 24 and 26 in FIG. 8. The lens holding member 54 can include a sleeve-like encasement in other embodiments, being fixedly engaged to the outer periphery of the lens elements. Still other lens holding members may be used in other embodiments as desired.

Figure 9:
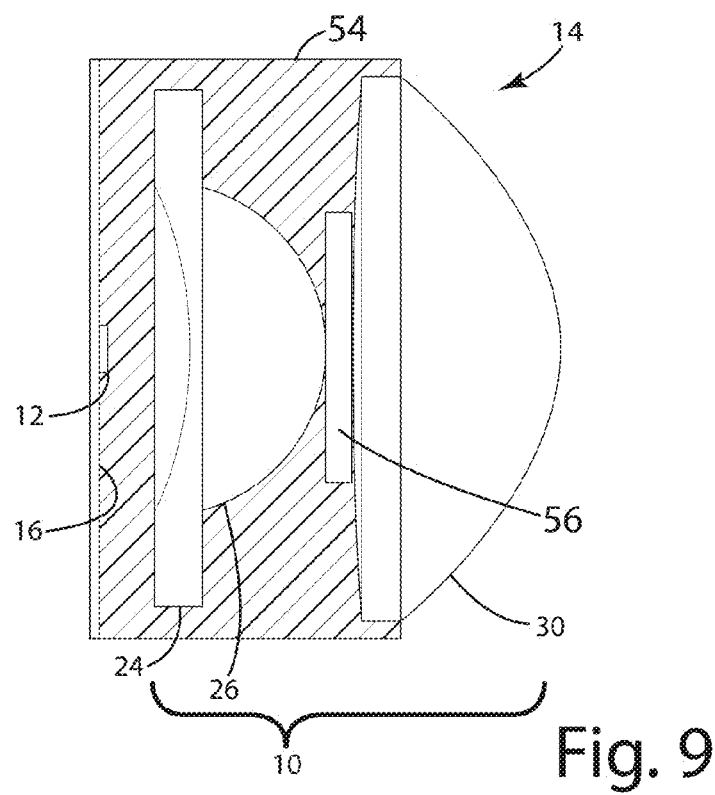
FIG. 9 is a sectional view of a compound lens including a planar screen between spaced apart lens elements in accordance with a current embodiment.

Referring now to FIG. 9, the optical emitter 10 can include a compound lens 10, an LED 12, a substrate 16, and a planar screen 56 in the transmission space between spaced apart lens elements 26, 30. The planar screen 56 can be selected to change the properties of the emitted light, including for example density variation and polarization of the emitted light. The planar screen 56 can be held in place by the lens holding member 54 in some embodiments, being positioned between lens elements of the compound lens 10. The lens holding member 54 can also interconnect lens elements that are already cohered to each other, for example elements 24 and 26 in FIG. 9.

The compound lens 10 can be spaced apart from the LED 12 as illustrated in FIGS. 1-3 and 8-9. Alternatively, the compound lens 10 can be in direct contact with the LED 12 for enhanced near field coupling of the illumination source with the compound lens. The compound lens 10 can include as few as two lens elements in a series optical path or as a multi-element optical stack.

II. Method of Manufacture

Figure 10:
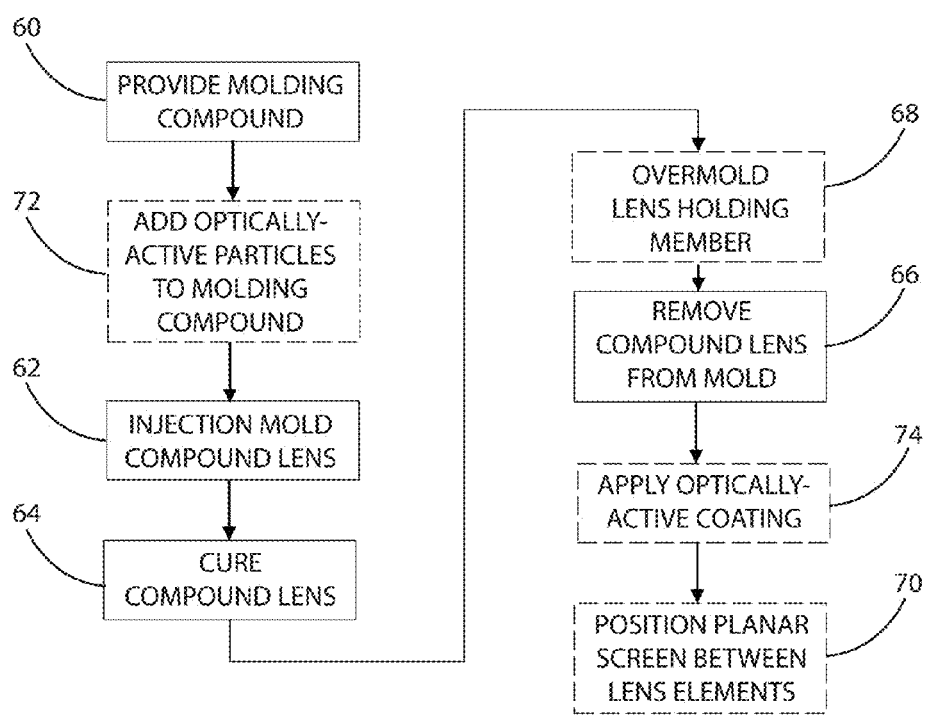
FIG. 10 is a flow chart illustrating a method of manufacturing the compound lens of FIG. 1 in accordance a current embodiment.

As shown in FIG. 10, a method for manufacturing a compound lens in accordance with one embodiment generally includes: providing a molding compound; injecting the molding compound within a mold cavity; curing a compound lens within the mold cavity; and removing the compound lens from the mold cavity, wherein the compound lens includes a first lens element integrally joined to a second lens element. Optional additional steps can include: overmolding a lens holding member onto the compound lens; adding (e.g., diffusing) particles to within the molding compound; inserting a planar screen between lens elements of the compound lens; and applying an optically-active coating to the compound lens. The compound lens is molded directly over an LED in some embodiments, while in other embodiments the compound lens is first molded and then positioned over an LED.

Providing a molding compound is illustrated as step 60 in FIG. 10. The molding compound can be selected to include sufficient clarity and transparency for optical transmission. The molding compound can include a number of different suitable materials, which are typically thermoset. One specific example of a suitable material is a curable silicone composition. A curable silicone composition is discussed in Part III below. Examples of curable silicone compositions include, but are not limited to, hydrosilylation-curable silicone compositions, condensation-curable silicone compositions, and free-radical-curable silicone compositions (e.g., radiation-curable silicone compositions and/or peroxide-curable silicone compositions). Each such example is briefly discussed below.

A hydrosilylation-curable silicone composition typically comprises an organopolysiloxane having an average of at least two silicon-bonded alkenyl groups or silicon-bonded hydrogen atoms per molecule; an organosilicon compound having an average of at least two silicon-bonded hydrogen atoms or silicon-bonded alkenyl groups per molecule capable of reacting with the silicon-bonded alkenyl groups or silicon-bonded hydrogen atoms in the organopolysiloxane; and a catalytic amount of a hydrosilylation catalyst. A condensation-curable silicone composition typically comprises an organopolysiloxane having an average of at least two silicon-bonded hydrogen atoms, hydroxy groups, or hydrolysable groups per molecule and, optionally, a crosslinking agent having silicon-bonded hydrolysable groups and/or a condensation catalyst. A radiation-curable silicone composition typically comprises an organopolysiloxane having an average of at least two silicon-bonded radiation-sensitive groups per molecule and, optionally, a cationic or free-radical photoinitiator depending on the nature of the radiation-sensitive groups in the organopolysiloxane. A peroxide-curable silicone composition typically comprises an organopolysiloxane having silicon-bonded unsaturated aliphatic hydrocarbon groups and an organic peroxide.

The curable silicone composition can be cured by exposing the composition to ambient temperature, elevated temperature, moisture, or radiation, depending on the type of curable silicone composition. Regardless of the particular type of curable silicone composition utilized as or to form the compound lens, the curable silicone composition, or the compound lens formed therefrom, typically comprises a silicone resin. The silicone resin may be a reactant in the particular curable silicone composition, or may be formed by curing the particular curable silicone composition. Alternatively, the curable silicone composition, or the compound lens formed therefrom, may comprise an elastomer or gel. Elastomers and gels have a lesser crosslink density than resins. The components of the curable silicone composition may comprise any combination of siloxy units independently selected from (R3SiO1/2), (R2SiO2/2), (RSiO3/2), or (SiO4/2) siloxy units, where R may be any suitable group or substituent. When R is a methyl group in siloxy units of an organopolysiloxane, the siloxy units are commonly referred to as M, D, T, and Q units respectively. These siloxy units can be combined in various manners to form cyclic, linear, branched, or resinous structures.

Silicone resins typically include T and/or Q units, whereas elastomers or gels have a lesser crosslink density and are typically substantially free from, alternatively free from, T and/or Q units. The curable silicone composition may be a one component system or a two component system. The silicone resin may be a DT resin, an MT resin, an MDT resin, a DTQ resin, and MTQ resin, and MDTQ resin, a DQ resin, an MQ resin, a DTQ resin, an MTQ resin, or an MDQ resin. Two or more different types of silicone resins may be utilized in combination with one another. In one specific embodiment, the curable silicone composition comprises a dimethyl siloxane, dimethylvinylsiloxy-terminated, an organosilicon compound comprising at least two silicon-bonded hydrogen atoms, and a hydrosilylation catalyst. In other embodiments, the molding compound can include optical grade ETPs that are substantially free of silicone, including for example polyphenylhydrazine.

Injection molding the compound lens is illustrated at step 62 in FIG. 10. This step can include injecting the molding compound into a single-cavity or multi-cavity mold via a central sprue and/or radial sprues. The number of cavities can vary. When injection molding the compound lens of FIG. 1, for example, the mold can include a single cavity. When injection molding the compound lens of FIGS. 8 and 9, for example, the mold can include two cavities, with a first cavity for the first and second lens elements 24, 26 and a second cavity for the spaced apart lens element 30. A greater number of cavities can be used in other embodiments where desired.

Curing the compound lens within the mold cavity is illustrated at step 64 in FIG. 10. The curing conditions (e.g., temperature, pressure, moisture, radiation) are a function of the molding compound being used. Removing the compound lens from the mold cavity is illustrated at step 66 in FIG. 10. Once removed, the compound lens can be aligned over one or more LEDs as part of an optical emitter. In other embodiments, the compound lens is molded directly onto the LED and/or the substrate (PCB).

As noted above, the method of manufacturing the compound lens can include a number of additional method steps. As illustrated in step 68 of FIG. 10, the method of manufacturing the compound lens can include overmolding a lens holding member onto the compound lens. This secondary over-molding process allows for a high strength opaque ETP skeleton or body to be molded around the compound lens, typically after the compound lens has solidified. Because the melt-flow temperature of the high strength ETP skeleton is below the reflow temperature of the silicone lens elements, the secondary over-molding process does not distort the over-molded compound lens. The two-step molding process can optionally be performed in a single die having two fill channels, one for optical silicone and one for structural ETPs. The inclusion of a lens holding member can provide a high temperature resistant, shock-proof compound lens having substantial mechanical strength. In addition, the lens holding member can be manufactured to compress or extend to create variable focusing properties for the compound lens. The compound lens can be used for active illumination source service as well as passive, return path optical sensing.

As illustrated in step 70 of FIG. 10, the method of manufacturing the compound lens can include inserting a planar screen in the transmission space between lens elements. The planar screen can be selected to change the properties of the emitted light, including for example density variation and polarization of the emitted light. The planar screen can be held in place by the lens holding member in some embodiments, being generally sandwiched between lens elements of the compound lens. The planar screen can be etched to include nano-etched paths, within which electro-active materials can be deposited. The electro-active materials can provide selective electronic control, thereby producing diffraction grids of varying optical density on the planar screen. The grids may, through their micrographic layout, create polarization grids or Fresnel lenses in the optical path of the compound lens.

As illustrated in step 72 of FIG. 10, the method of manufacturing the compound lens can include introducing an optically active material into the molding compound. The optically active material can include electro-optically active particles, for example nanoparticles, that respond to an electrical stimulus to selectively refract light and change the refractive index or optical density of the compound lens. The optically active material can be diffused into the molding compound while in a viscous, pre-cured state. As illustrated at step 74, the optically active material can also or alternatively be coated onto one or more of the lens elements to provide improved control of the emitted light. The focal length of the lens elements can be controlled through a circuit-board mounting connection as a tuned electrical current which activates the dopants diffused throughout the particular lens element or the relevant electro-optical coating on the lens element.

The method of manufacturing the compound lens can include introducing a liquid-lens material into the transition space between adjacent lens elements. The liquid-lens material can change shape under controlled electrical stimulation and thereby change focal length through expansion and contraction of net-molded shape of the compound lens. The liquid-lens material can be injected into a single die having two fill channels, one for the molding compound and one for the liquid lens material. The liquid lens material can also be in the form of a lens element, abutting one or more adjacent lens elements formed from a silicone resin, for example.

III. Molding Composition

A molding composition in accordance with one embodiment is hydrosilylation curable to form a cured product. The composition comprises: (A) a polymer combination comprising (A1) a low viscosity polydiorganosiloxane having an average of at least two aliphatically unsaturated organic groups per molecule and having a viscosity of up to 12,000 mPa·s, and (A2) a high viscosity polydiorganosiloxane having an average of at least two aliphatically unsaturated organic groups per molecule and having a viscosity of at least 45,000 mPa·s; (B) a silicone resin having an average of at least two aliphatically unsaturated organic groups per molecule; (C) a crosslinker having an average, per molecule, of at least two silicon bonded hydrogen atoms; and (D) a hydrosilylation catalyst; wherein the ingredients and their amounts in the composition are selected such that a ratio of a total amount of silicon bonded hydrogen atoms in the composition/a total amount of aliphatically unsaturated organic groups in the composition (SiH/Vi ratio, a mole ratio) ranges from 1.2 to 1.7, alternatively 1.5, the cured product has Shore A hardness of at least 30, tensile strength of at least at least 3 MPa (megapascals), and elongation at break of at least 50%.

Ingredient (A) Polymer Combination

Ingredient (A) is a polymer combination. The polymers comprise aliphatically unsaturated polydiorganosiloxanes that differ in viscosity. The polymer combination comprises: (A1) a low viscosity polydiorganosiloxane having an average of at least two aliphatically unsaturated organic groups per molecule and having a viscosity of up to 12,000 mPa·s, and (A2) a high viscosity polydiorganosiloxane having an average of at least two aliphatically unsaturated organic groups per molecule and having a viscosity of at least 45,000 mPa·s.

The aliphatically unsaturated organic groups in ingredient (A) may be alkenyl exemplified by, but not limited to, vinyl, allyl, butenyl, pentenyl, and hexenyl; alternatively vinyl. The aliphatically unsaturated organic groups may be alkynyl groups exemplified by, but not limited to, ethynyl, propynyl, and butynyl. The aliphatically unsaturated organic groups in ingredient (A) may be located at terminal, pendant, or both terminal and pendant positions. Alternatively, the aliphatically unsaturated organic groups in ingredient (A) may be located at terminal positions of the polydiorganosiloxanes.

The remaining silicon-bonded organic groups in the polydiorganosiloxanes of ingredient (A) may be monovalent organic groups, which are substituted and unsubstituted hydrocarbon groups free aliphatic unsaturation. Monovalent unsubstituted hydrocarbon groups are exemplified by, but not limited to alkyl groups such as methyl, ethyl, propyl, pentyl, octyl, undecyl, and octadecyl; cycloalkyl groups such as cyclohexyl; and aromatic groups such as ethylbenzyl, naphthyl, phenyl, tolyl, xylyl, benzyl, styryl, 1-phenylethyl, and 2-phenylethyl, alternatively phenyl. Monovalent substituted hydrocarbon groups are exemplified by, but not limited to halogenated alkyl groups such as chloromethyl, 3-chloropropyl, and 3,3,3-trifluoropropyl, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl.

The polydiorganosiloxanes for ingredients (A1) and (A2) each have an average per molecule of at least two aliphatically unsaturated organic groups. Ingredient (A1) can be a single polydiorganosiloxane or a combination comprising two or more polydiorganosiloxanes that differ in at least one of the following properties: structure, average molecular weight, siloxane units, and sequence. The viscosity of ingredient (A1) is up to 12,000 mPa·s. Alternatively, the viscosity of ingredient (A1) may range from 300 mPa·s to 12,000 mPa·s, alternatively 300 mPa·s to 2,500 mPa·s, and alternatively 300 mPa·s to 2,000 mPa·s. The amount of ingredient (A1) in the composition may range from 10% to 90%, alternatively 70% to 80%, based on the combined weight of ingredient (A).

Ingredient (A1) may have general formula (I): R13SiO—(R22SiO)a-SiR13, where each R1 and each R2 are independently selected from the group consisting of aliphatically unsaturated organic groups and monovalent organic groups such as the substituted and unsubstituted hydrocarbon groups described above, and subscript a is an integer having a value sufficient to provide ingredient (A) with a viscosity up to 12,000 mPa·s, with the proviso that on average at least two of R1 and/or R2 are unsaturated organic groups. Alternatively, formula (I) may be an α,ω-dialkenyl-functional polydiorganosiloxane.

Ingredient (A2) can be a single polydiorganosiloxane or a combination comprising two or more polydiorganosiloxanes that differ in at least one of the following properties: structure, average molecular weight, siloxane units, and sequence. The viscosity of ingredient (A2) is at least 45,000 mPa·s. Alternatively, the viscosity of ingredient (A2) may range from 45,000 to 65,000 mPa·s. The amount of ingredient (A2) in the composition may range from 10% to 90%, alternatively 20% to 30%, parts by weight based on the combined weight of the polymers in ingredient (A).

Ingredient (A2) may have general formula (II): R33SiO—(R42SiO)b-SiR33, where each R3 and each R4 are independently selected from the group consisting of aliphatically unsaturated organic groups and monovalent organic groups such as the substituted and unsubstituted hydrocarbon groups described above, and subscript b is an integer having a value sufficient to provide ingredient (A) with a viscosity of at least 45,000 mPa·s, alternatively 45,000 mPa·s to 65,000 mPa·s, with the proviso that on average at least two of R3 and/or R4 are unsaturated organic groups. Alternatively, formula (II) may be an α,ω-dialkenyl-functional polydiorganosiloxane.

Ingredient (B) Silicone Resin

The silicone resin contains an average of at least two aliphatically unsaturated organic groups per molecule. The amount of aliphatically unsaturated organic groups in the resin may be up to 3.0% based on the weight of the silicone resin. Alternatively, the amount of aliphatically unsaturated organic groups in the silicone resin may range from 1.9% to 3.0%, alternatively 2.0% to 3.0%, alternatively 1.5% to 3.0%, alternatively 1.9% to 3.0%, and alternatively 1.5% to 2.0% on the same basis. The silicone resin comprises monofunctional (M) units represented by R53SiO1/2 and tetrafunctional (Q) units represented by SiO4/2. R5 represents a monovalent organic group, which is a substituted or unsubstituted monovalent hydrocarbon group. The silicone resin is soluble in liquid hydrocarbons such as benzene, toluene, xylene, heptane and the like or in liquid organosilicon compounds such as low viscosity cyclic and linear polydiorganosiloxanes. Examples include the solvents described below.

In the R53SiO1/2 unit, R5 may be a monovalent unsubstituted hydrocarbon group, exemplified by alkyl groups such as methyl, ethyl, propyl, pentyl, octyl, undecyl, and octadecyl; alkenyl groups, such as vinyl, allyl, butenyl, pentenyl and hexenyl; cycloaliphatic radicals, such as cyclohexyl and cyclohexenylethyl; alkynyl groups such as, ethynyl, propynyl, and butynyl; cycloalkyl groups such as cyclopentyl and cyclohexyl; and aromatic groups such as ethylbenzyl, naphthyl, phenyl, tolyl, xylyl, benzyl, styryl, 1-phenylethyl, and 2-phenylethyl, alternatively phenyl. Non-reactive substituents that can be present on R5 include but are not limited to halogen and cyano. Monovalent organic groups which are substituted hydrocarbon groups are exemplified by, but not limited to halogenated alkyl groups such as chloromethyl, 3-chloropropyl, and 3,3,3-trifluoropropyl, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl.

The silicone resin may have a ratio of M units to Q units (M:Q ratio) ranging from 0.6:1 to 1.1:1. The silicone resin may have a number average molecular weight ranging from 2,000 to 5,000, see U.S. Pat. No. 6,124,407 for a description of suitable silicone resins and how to prepare them.

The silicone resin can be prepared by any suitable method. Silicone resins of this type have reportedly been prepared by cohydrolysis of the corresponding silanes or by silica hydrosol capping methods known in the art. The silicone resin may be prepared by the silica hydrosol capping processes of Daudt, et al., U.S. Pat. No. 2,676,182; of Rivers-Farrell et al., U.S. Pat. No. 4,611,042; of Butler, U.S. Pat. No. 4,774,310; and of Lee, et al., U.S. Pat. No. 6,124,407.

The intermediates used to prepare the silicone resin are typically triorganosilanes of the formula R53SiX', where R5 is as described above and X' represents a hydrolyzable group, and either a silane with four hydrolyzable groups, such as halogen, alkoxy or hydroxyl, or an alkali metal silicate such as sodium silicate.

It is desirable that the content of silicon-bonded hydroxyl groups (i.e., HOSiO3/2 groups) in the silicone resin be below 0.7% of the total weight of the silicone resin, alternatively below 0.3%. Silicon-bonded hydroxyl groups formed during preparation of the silicone resin may be converted to trihydrocarbylsiloxy groups or hydrolyzable groups by reacting the silicone resin with a silane, disiloxane or disilazane containing the appropriate terminal group. Silanes containing hydrolyzable groups are typically added in excess of the quantity required to react with the silicon-bonded hydroxyl groups of the silicone resin.

The silicone resin may be one silicone resin. Alternatively, the silicone resin may comprise two or more silicone resins, where the resins differ in at least one of the following properties: structure, hydroxyl and/or hydrolyzable group content, molecular weight, siloxane units, and sequence. The amount of silicone resin in the composition may vary depending on the type and amounts of polymers present, and the aliphatically unsaturated organic groups (e.g., vinyl) content of ingredients (A) and (B), however, the amount of silicone resin may range from 25% to 40%, alternatively 26% to 38%, by weight of the composition.

Ingredient (C) Crosslinker

Ingredient (C) is a crosslinker having an average, per molecule, of at least two silicon bonded hydrogen atoms. Ingredient (C) may comprise a polyorganohydrogensiloxane. Ingredient (C) can be a single polyorganohydrogensiloxane or a combination comprising two or more polyorganohydrogensiloxanes that differ in at least one of the following properties: structure, viscosity, average molecular weight, siloxane units, and sequence.

Ingredient (C) may comprise a linear polyorganohydrogensiloxane of general formula (III): HR62SiO—(R62SiO)c-SiR62H, where each R6 is independently a hydrogen atom, or a monovalent organic group, which is a monovalent substituted or unsubstituted hydrocarbon group as exemplified above for R5, with the proviso that on average at least two R6 per molecule are hydrogen atoms, and subscript c is an integer with a value of 1 or more. Alternatively, at least three R6 per molecule are hydrogen atoms and c may range from 1 to 20, alternatively 1 to 10. Ingredient (C) may comprise a hydrogen terminated polydiorganosiloxane. Alternatively, ingredient (C) may comprise a poly(dimethyl/methylhydrogen)siloxane copolymer.

Alternatively, ingredient (C) may comprise a branched polyorganohydrogensiloxane of unit formula (IV): (R7SiO3/2)d(R72SiO2/2)e(R73SiO1/2)f(SiO4/2)g(X'O)h where X' is an alkoxy-functional group. Each R7 is independently a hydrogen atom or a monovalent organic group, which is a monovalent substituted or unsubstituted hydrocarbon group as exemplified above for R5, with the proviso that an average of at least two per molecule of R7 are hydrogen atoms. In formula (IV), the polyorganohydrogensiloxane contains an average of at least two silicon bonded hydrogen atoms per molecule, however, 0.1 mol % to 40 mol % of R7 may be hydrogen atoms.

In formula (IV), subscript d is a positive number, subscript e is 0 or a positive number, subscript f is 0 or a positive number, subscript g is 0 or a positive number, subscript h is 0 or a positive number, e/d has a value ranging from 0 to 10, f/e has a value ranging from 0 to 5, g/(d+e+f+g) has a value ranging from 0 to 0.3, and h/(d+e+f+g) has a value ranging from 0 to 0.4. The amount of ingredient (C) added is sufficient to provide the SiH/Vi ratio in the range described above.

Ingredient (D) Hydrosilyation Catalyst

Ingredient (D) is a hydrosilylation catalyst. Ingredient (D) is added in an amount sufficient to promote curing of the composition. However, the amount of ingredient (D) may range from 0.01 to 1,000 ppm, alternatively 0.01 to 100 ppm, and alternatively 0.01 to 50 ppm, alternatively 1 to 18 ppm, and alternatively 1 to 7 ppm, of platinum group metal based on the weight of this silicone composition.

Suitable hydrosilylation catalysts are known in the art and commercially available. Ingredient (D) may comprise a platinum group metal selected from the group consisting of platinum, rhodium, ruthenium, palladium, osmium or iridium metal or organometallic compound thereof, and a combination thereof. Ingredient (D) is exemplified by platinum black, compounds such as chloroplatinic acid, chloroplatinic acid hexahydrate, a reaction product of chloroplatinic acid and a monohydric alcohol, platinum bis-(ethylacetoacetate), platinum bis-(acetylacetonate), platinum dichloride, and complexes of said compounds with olefins or low molecular weight organopolysiloxanes or platinum compounds microencapsulated in a matrix or core-shell type structure. Complexes of platinum with low molecular weight organopolysiloxanes include 1,3-diethenyl-1,1,3,3-tetramethyldisiloxane complexes with platinum. These complexes may be microencapsulated in a resin matrix. Alternatively, the catalyst may comprise 1,3-diethenyl-1,1,3,3-tetramethyldisiloxane complex with platinum.

Suitable hydrosilylation catalysts for ingredient (D) are described in, for example, U.S. Pat. Nos. 3,159,601; 3,220, 972; 3,296,291; 3,419,593; 3,516,946; 3,814,730; 3,989, 668; 4,784,879; 5,036,117; and 5,175,325 and EP 0 347 895 B. Microencapsulated hydrosilylation catalysts and methods of preparing them are also known in the art, as exemplified in U.S. Pat. Nos. 4,766,176; and 5,017,654.

Additional Ingredients

The composition described above may further comprise an additional ingredient. Suitable additional ingredients include, but are not limited to (E) an inhibitor, (F) a mold release agent, (G) an optically active agent, (H) a filler, and combinations thereof.

Ingredient (E) Inhibitor

Ingredient (E) is an inhibitor. Suitable inhibitors are exemplified by acetylenic alcohols, cycloalkenylsiloxanes, ene-yne compounds, triazoles, phosphines; mercaptans; hydrazines; amines, and combinations thereof. Suitable acetylenic alcohols are exemplified by methyl butynol, ethynyl cyclohexanol, dimethyl hexynol, 3,5-dimethyl-1-hexyn-3-ol, and a combination thereof; cycloalkenylsiloxanes such as methylvinylcyclosiloxanes exemplified by 1,3, 5,7-tetramethyl-1,3,5,7-tetravinylcyclotetrasiloxane, 1,3,5, 7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines such as tetramethyl ethylenediamine, dialkyl fumarates, dialkenyl fumarates, dialkoxyalkyl fumarates, maleates such as diallyl maleate, and a combination thereof. Suitable inhibitors are disclosed by, for example, U.S. Pat. Nos. 3,445,420; 3,989,667; 4,584,361; and 5,036,117. Alternatively, ingredient (E) may comprise an organic acetylenic alcohol, a silylated acetylenic alcohol, or a combination thereof. Examples of organic acetylenic alcohol inhibitors are disclosed, for example, in EP 0 764 703 A2 and U.S. Pat. No. 5,449,802 and include 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol. Alternatively, ingredient (E) in the composition may be a silylated acetylenic inhibitor. Without wishing to be bound by theory, it is thought that adding a silylated acetylenic inhibitor may reduce yellowing of the cured product prepared from the composition as compared to a cured product prepared from a hydrosilylation curable composition that does not contain an inhibitor or that contains an organic acetylenic alcohol inhibitor. The silicone composition may be free of organic acetylenic alcohol inhibitors. "Free of organic acetylenic alcohol inhibitors" means that if any organic acetylenic alcohol is present in the composition, the amount present is insufficient to reduce optical transparency of the cured product to <95% at a thickness of 2.0 mm or less at 400 nm wavelength after heating at 200° C. for 14 days.

Ingredient (E) may be added in an amount ranging from 0.001 to 1 parts by weight based on the total weight of the composition, alternatively 0.01 to 0.5 parts by weight. Suitable silylated acetylenic inhibitors for ingredient (E) may have general formula (V):

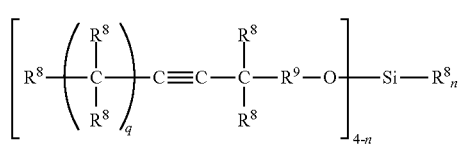

or general formula (VI):

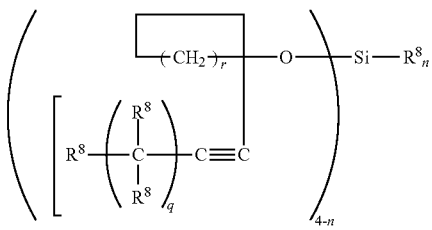

or a combination thereof; where each R8 is independently a hydrogen atom or a monovalent organic group, and subscript n is 0, 1, 2, or 3, subscript q is 0 to 10, and subscript r is 4 to 12. Alternatively n is 1 or 3. Alternatively, in general formula (V), n is 3. Alternatively, in general formula (VI), n is 1. Alternatively q is 0. Alternatively, r is 5, 6, or 7, and alternatively r is 6. Examples of monovalent organic groups for R8 include an aliphatically unsaturated organic group, an aromatic group, or a monovalent organic group, which is a monovalent substituted or unsubstituted hydrocarbon group free of aromatics and free aliphatic unsaturation, as described above. R9 is a covalent bond or a divalent hydrocarbon group.

Silylated acetylenic inhibitors are exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)dimethylmethylsilane, (cyclohexyl-1-ethyn-1-oxy)diphenylmethylsilane, (cyclohexyl-1-ethyn-1-oxy)trimethylsilane, and combinations thereof. Alternatively, ingredient (E) is exemplified by methyl(tris(1,1-dimethyl-2-propynyloxy))silane, ((1,1-dimethyl-2-propynyl)oxy)trimethylsilane, or a combination thereof.

The silylated acetylenic inhibitor may be prepared by methods known in the art for silylating an alcohol such as reacting a chlorosilane of formula R6nSiCl4-n with an acetylenic alcohol of formula

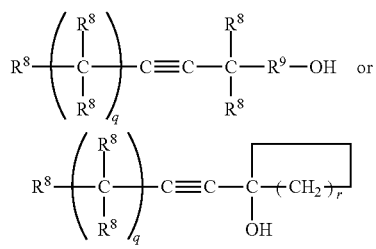

in the presence of an acid receptor. In these formulae, n, q, r, and R8 are as described above and R9 is a covalent bond or a divalent hydrocarbon group. Examples of silylated acetylenic inhibitors and methods for their preparation are disclosed, for example, in EP 0 764 703 A2 and U.S. Pat. No. 5,449,802.

Ingredient (F) Mold Release Agent

Ingredient (F) is an optional mold release agent. Ingredient (F) may have general formula (VI): R103SiO(R102SiO)i(R10R11SiO)jSiR103, where each R10 is independently a hydroxyl group or a monovalent organic group, and each R11 is independently a monovalent organic group unreactive with aliphatically unsaturated organic groups and silicon-bonded hydrogen atoms in the composition, subscript i has a value of 0 or greater, subscript j has a value of 1 or greater with the proviso that i and j have may have values sufficient that the mold release agent has a viscosity of 50 to 3,000 mPa·s at molding process temperatures. Alternatively, each R10 may independently be an alkyl group such as methyl, ethyl, propyl, or butyl or an alkoxy group such as methoxy, ethoxy, propoxy, or butoxy, and each R11 may independently be an aromatic group such as phenyl, tolyl, or xylyl. Alternatively each R10 may be methyl and each R11 may be phenyl. Examples of suitable mold release agents include trimethylsiloxy-terminated (dimethylsiloxane/phenylmethylsiloxane) copolymer having a viscosity of 100 to 500 mPa·s at 25° C.

Alternatively, ingredient (F) may comprise an α,ω-dihydroxy-functional polydiorganosiloxane that may be added to the composition in an amount ranging from 0% to 5%, alternatively 0.25% to 2% based on the weight of the composition. Ingredient (F) can be a single polydiorganosiloxane or a combination comprising two or more polydiorganosiloxanes that differ in at least one of the following properties: structure, viscosity, average molecular weight, siloxane units, and sequence. The viscosity of ingredient (F) is not critical and may range from 50 to 1,000 mPa·s at 25° C. Ingredient (F) may contain at least one aromatic group per molecule, and the aromatic groups are as exemplified above. Ingredient (F) may contain at least 15 mol %, alternatively at least 30 mol % aromatic groups.

Ingredient (F) may comprise an α,ω-dihydroxy-functional polydiorganosiloxane of general formula (VI'): HOR122SiO—(R122SiO)k-SiR122OH, where each R12 is independently an aromatic group as exemplified above, or a monovalent substituted or unsubstituted hydrocarbon group free of aromatics and free aliphatic unsaturation as exemplified above, with the proviso that on average at least one R12 per molecule is an aromatic group, and subscript k is an integer with a value of 1 or more. Alternatively, at least one R12 per molecule is phenyl and k may range from 2 to 8. Alternatively, an organic mold release agent could be used instead of the siloxanes described above.

Ingredient (G) Optically Active Agent

Ingredient (G) is an optically active agent. Examples of ingredient (G) include optical diffusants, phosphor powders, photonic crystals, quantum dots, carbon nanotubes, dyes such as fluorescent dyes or absorbing dyes, and combinations thereof. The exact amount of ingredient (G) depends on the specific optically active agent selected, however, ingredient (G) may be added in an amount ranging from 0% to 20%, alternatively 1% to 10% based on the weight of the silicone composition. Ingredient (G) may be mixed with the silicone composition or coated on a surface of the optical device prepared by curing the silicone composition to a cured product.

Ingredient (H) Filler

Ingredient (H) is a filler. Suitable fillers are known in the art and are commercially available. For example, ingredient (H) may comprise an inorganic filler such as silica, e.g., colloidal silica, fumed silica, quartz powder, titanium oxide, glass, alumina, zinc oxide, or a combination thereof. The filler may have an average particle diameter of 50 nanometers or less and does not lower the percent transmittance by scattering or absorption. Alternatively, ingredient (H) may comprise an organic filler such as poly(meth)acrylate resin particles. Ingredient (H) may be added in an amount ranging from 0% to 50%, alternatively 1% to 5% based on the weight of the silicone composition.

The silicone composition described above may be prepared by any convenient means, such as mixing all ingredients at ambient or elevated temperature. The silicone composition may be prepared as a one-part composition or a multiple part composition. A one-part silicone composition can be prepared by mixing ingredients (A), (B), (C), and (D) and any additional ingredients, if present. If a one part silicone composition will be prepared, pot life of the composition may be extended by adding ingredient (E) described above. If the silicone composition will be used in a molding process (or overmolding process), such as that described herein, then ingredient (F) may be added. In a multiple part composition, such as a two part composition, ingredients (C) and (D) are stored in separate parts. For example, a base part may be prepared by mixing ingredients comprising: 60% to 75% ingredient (A), 25% to 40% ingredient (B), and 6 ppm ingredient (D). The base part may optionally further comprise 0.2 to 5 parts ingredient (F), (G), and/or (H). A curing agent part may be prepared by mixing ingredients comprising: 50% to 70% ingredient (A), 20% to 37% ingredient (B), 7% to 16% by weight ingredient (C), and 0.001 to 1% ingredient (E). The curing agent part may optionally further comprise 0.2 to 5 parts ingredient (F), (G), and/or (H). The base part and the curing agent part may be stored in separate containers until just prior to use, when the two parts are mixed together in a ratio of 1 to 10 parts base per 1 part curing agent. These amounts are exemplary (taken from another application).

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A compound lens comprising:
a first lens element;
a second lens element in alignment with the first lens element along a common optical axis, wherein the first and second lens elements are integrally joined to each other, wherein the first and second lens elements are co-molded from a silicone resin, and wherein the first and second lens elements are optically coupled to each other to reduce the optical path difference of center ray bundles and sagittal ray bundles propagating through the compound lens;
a third lens element integrally joined to the second lens element, the third lens element being a bi-concave frusto-conical lens, the bi-concave frusto-conical lens separating the center ray bundle from the sagittal ray bundle; and
a fourth lens element integrally joined to the third lens element, the fourth lens element being a bi-convex aspheric lens, wherein the third and fourth lens elements are in alignment with the first and second lens elements along the common optical axis.

2. The compound lens of claim 1 wherein the first lens element is a plano-concave lens and the second lens element is a hemispherical lens.

3. The compound lens of claim 1 wherein the silicone resin forming the first and second lens elements is includes electro-optically active particles dispersed therein.

4. The compound lens of claim 1 further including a coating of electro-optically active particles on at least one of the first lens element and the second lens element.

5. An optical emitter comprising:
a light emitting diode; and
a compound lens positioned over the light emitting diode, the compound lens including:
a first lens element having a light receiving surface and a light emitting surface,
a second lens element having a light receiving surface and a light emitting surface, wherein the first and second lens elements are integrally joined to each other along an interface between the light emitting surface of the first lens element and the light receiving surface of the second lens element, wherein the first and second lens elements are co-molded from a silicone resin, wherein the first lens element is in optical alignment along a common optical axis with the second lens element, and wherein the first and second lens elements are optically coupled to each other to reduce the optical path difference of light propagating through the compound lens,
a third lens element having a light receiving surface and a light emitting surface, wherein the third lens element is a bi-concave frusto-conical lens and is integrally joined to the second lens element along an interface between the light emitting surface of the second lens element and the light receiving surface of the third lens element, and
a fourth lens element having a light receiving surface and a light emitting surface, wherein the fourth element is a bi-convex aspheric lens and wherein the third and fourth lens elements are integrally joined to each other along an interface between the light emitting surface of the third lens element and the light receiving surface of the fourth lens element.

6. The optical emitter of claim 5 further including a lens holding member interconnecting the first lens element and the second lens element.

7. The optical emitter of claim 5 wherein the first lens element is a plano-concave lens and the second lens element is a hemispherical lens.

8. The optical emitter of claim 5 wherein the silicone resin forming the first and second lens elements includes electro-optically active particles.

9. A method of illuminating an object disposed in optical communication with the optical emitter of claim 5, the method comprising applying a voltage to the light emitting diode of the optical emitter so as to emit light from the optical emitter onto an object.

10. A method of manufacturing an optical emitter comprising:
- providing a silicone resin molding compound;
- providing a mold including an upper mold member and a lower mold member defining a compound lens mold cavity;
- injecting the silicone resin molding compound to within the compound lens mold cavity;
- curing the resin molding compound to form a compound lens, the compound lens including a plurality of lens elements having a light receiving surface and a light emitting surface;
- over-molding a lens holding member onto the compound lens;
- removing the compound lens from the mold; and
- positioning the compound lens over a light emitting diode, thereby giving the optical emitter, wherein the plurality of lens elements are integrally joined to each other sequentially along an interface between the light emitting surface of one lens element and the light receiving surface of an immediately adjacent lens element.

11. The method according to claim 10 further including positioning a planar screen between immediately adjacent ones of the plurality of lens elements of the compound lens.

12. The method according to claim 10 further including introducing electro-optically active particles into the silicone resin molding compound prior to injection into the mold cavity.

13. The method according to claim 10 further including coating the compound lens with electro-optically active particles.

* * * * *